No. 868,495. PATENTED OCT. 15, 1907.
T. SHIPLEY.
ICE MACHINERY.
APPLICATION FILED MAY 10, 1907.

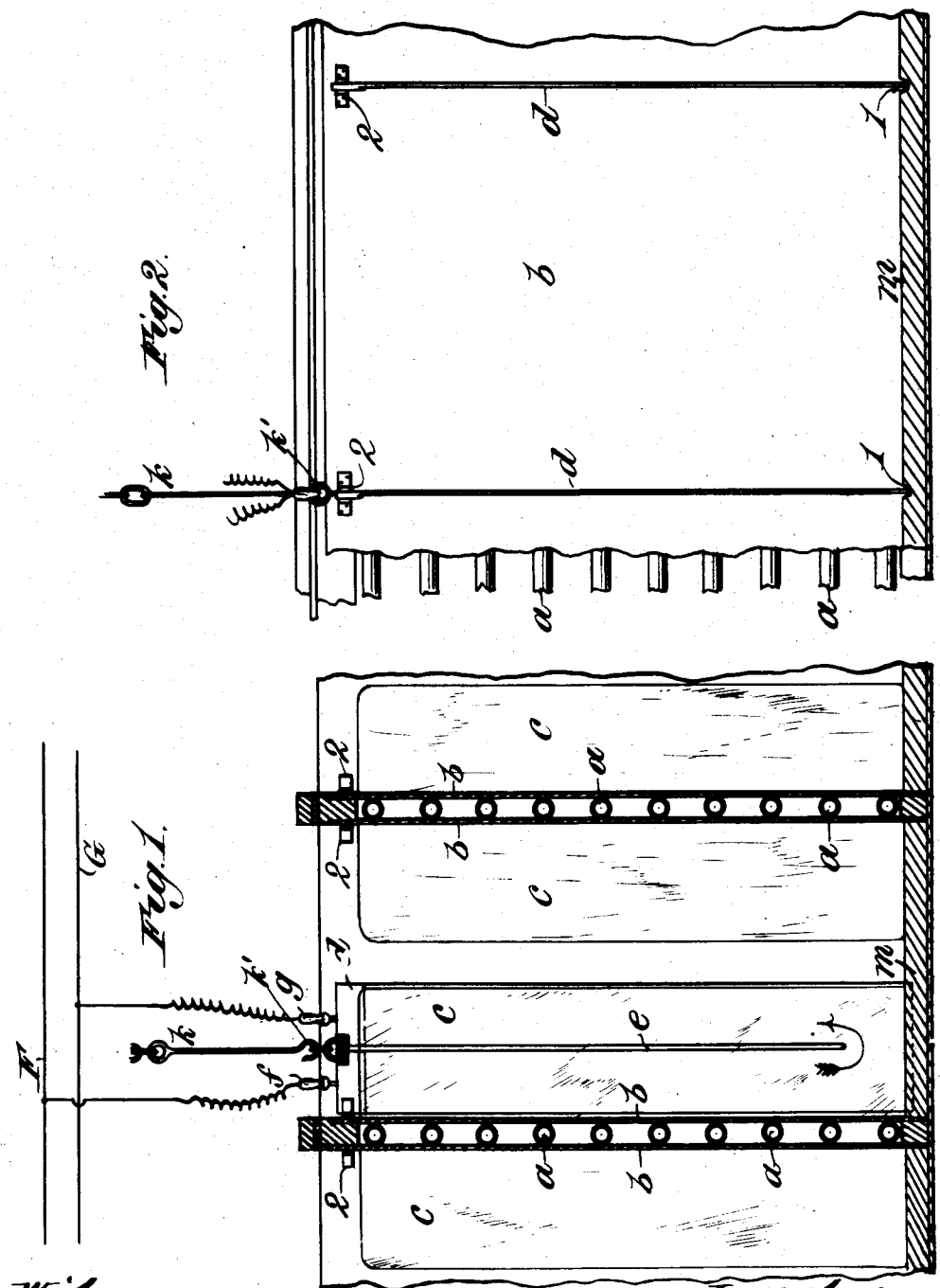

5 SHEETS—SHEET 2.

Witnesses. Inventor.
Thomas Shipley.
By

No. 868,495. PATENTED OCT. 15, 1907.
T. SHIPLEY.
ICE MACHINERY.
APPLICATION FILED MAY 10, 1907.
5 SHEETS—SHEET 3.
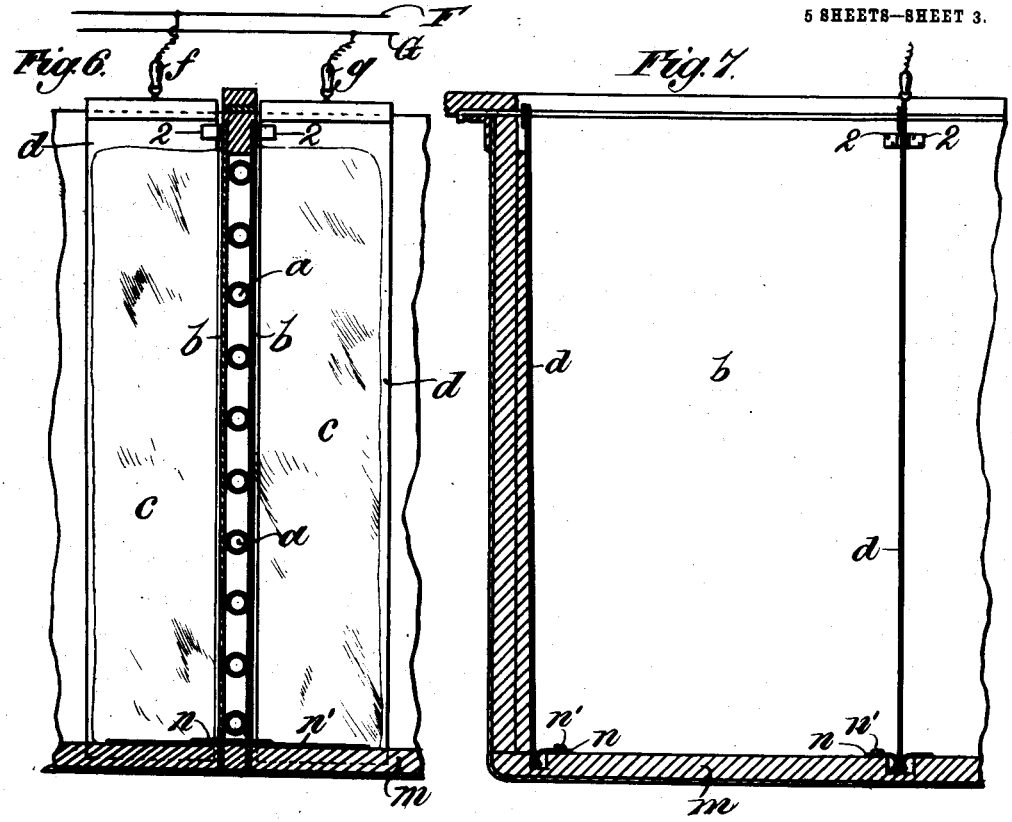
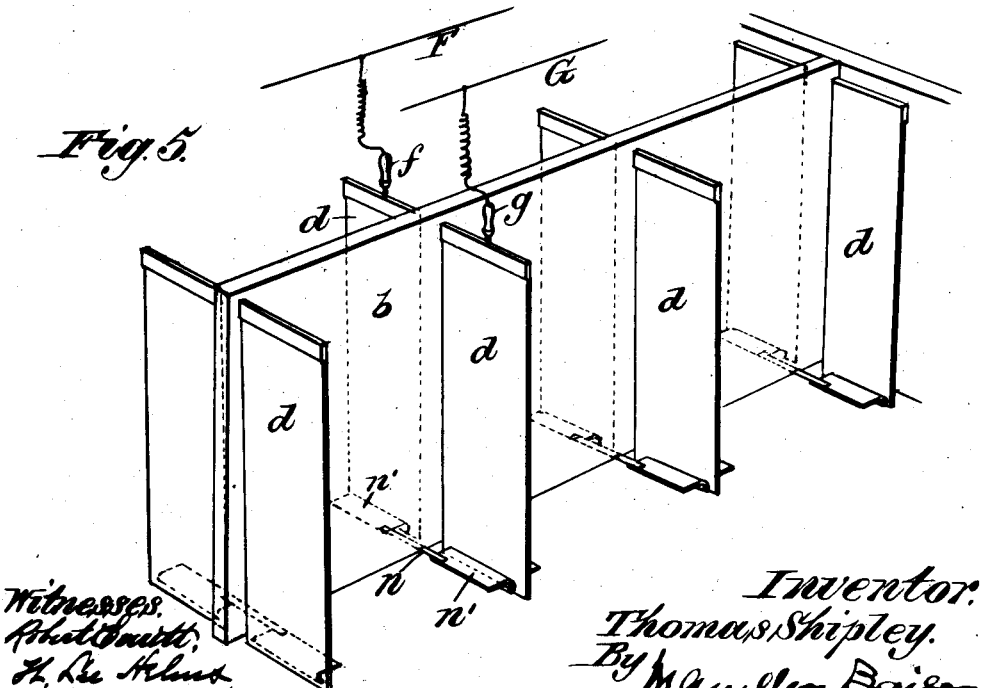
Inventor:
Thomas Shipley.

No. 868,495. PATENTED OCT. 15, 1907.
T. SHIPLEY.
ICE MACHINERY.
APPLICATION FILED MAY 10, 1907.
5 SHEETS—SHEET 4.
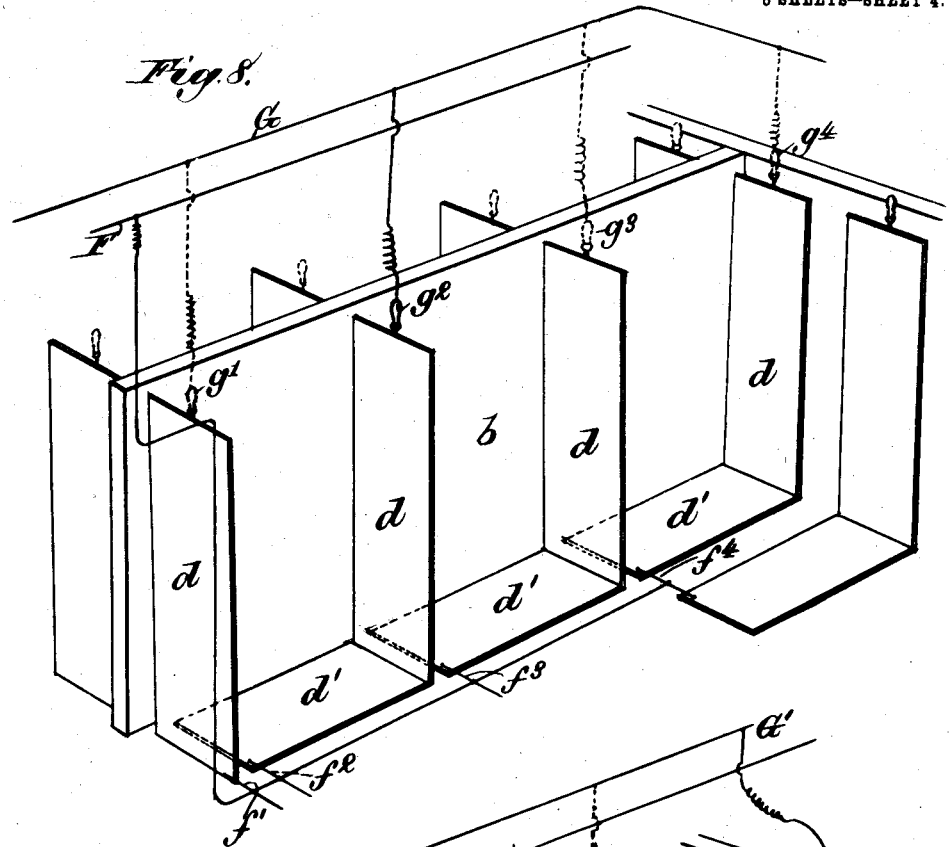
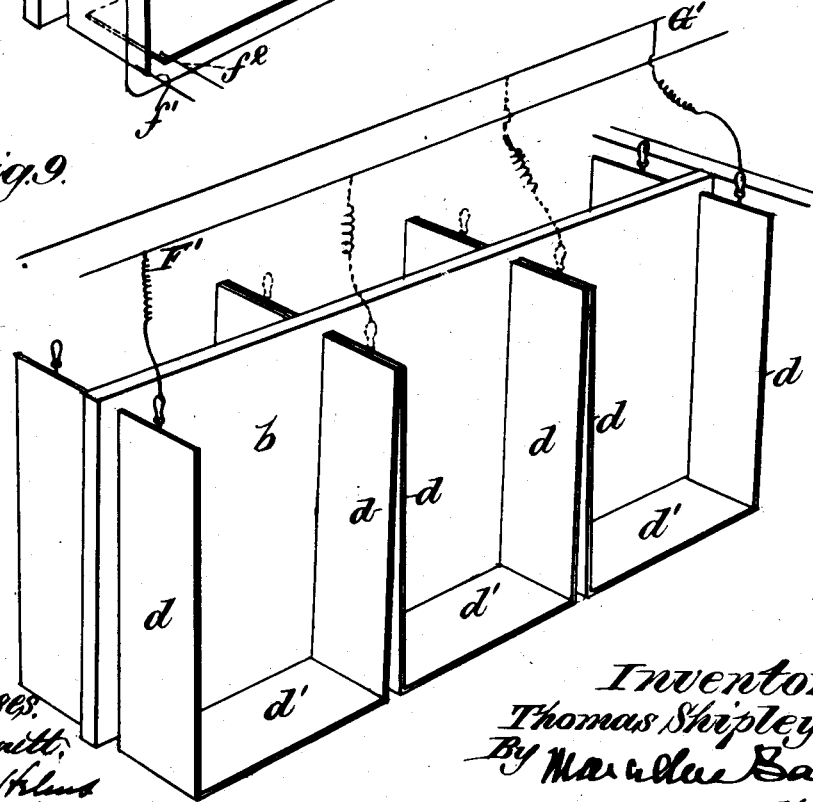
Witnesses:
Inventor:
Thomas Shipley,
By Marulee Bailey
Att'y.

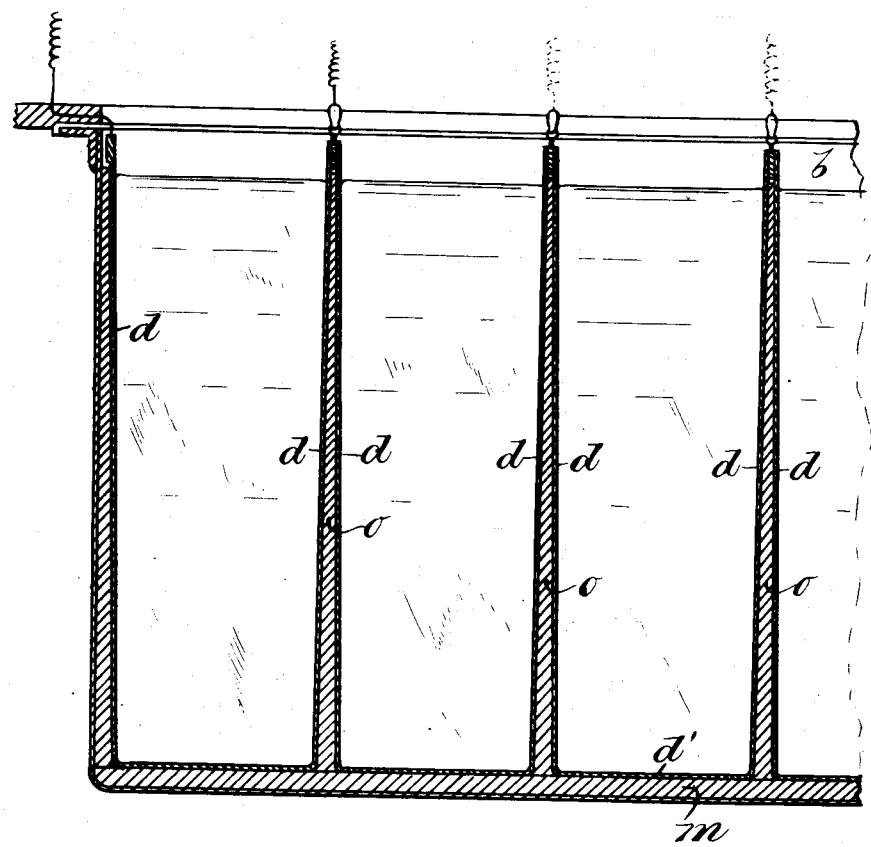
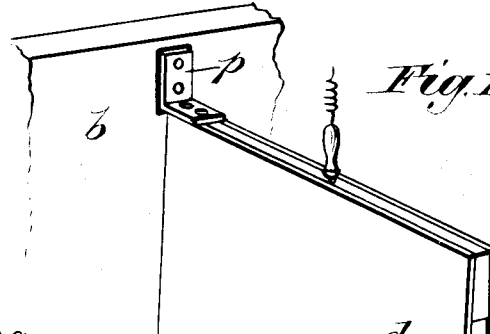

UNITED STATES PATENT OFFICE.

THOMAS SHIPLEY, OF YORK, PENNSYLVANIA.

ICE MACHINERY.

No. 868,495.         Specification of Letters Patent.         Patented Oct. 15, 1907.

Application filed May 10, 1907. Serial No. 372,883.

*To all whom it may concern:*

Be it known that I, THOMAS SHIPLEY, a citizen of the United States, residing in the city of York, in the county of York and State of Pennsylvania, have invented a new and useful Improvement in Ice Machinery, of which the following is a specification.

My improvement relates to that class of apparatus in which the ice is made in tanks filled with the water to be frozen—the ice forming upon the walls of the cells, or the coils, through which the refrigerant passes. When coils are used, it is customary to apply plates to them on each side, and the ice forms on these plates.

My invention has to do with thawing off the formed large cake of ice from the surfaces on which it has formed, and of separating or dividing it up *in situ* for ease of removal from the tank. It may be employed in either the "cell" system or the "plate" system. It, however, is more particularly useful in the last mentioned system; and it is in this connection that I shall describe it.

My purpose is to use electricity to do the thawing of the ice, and to pass it for this purpose through conducting plates, which are included in the circuit at will, and constitute also division walls by which the ice cake is divided up into smaller cakes. These plates are arranged in proximity to, but insulated from, and at right angles with the surfaces on which the ice is formed, and constitute partition plates which define the limits of the subsequently thawed off ice cakes;
and they are of relatively low electrical conductivity, so that they will be heated by the electrical current which is passed through them.

To enable those skilled in the art to understand and use my invention, I will now proceed to describe the manner in which the same is, or may be, carried into effect, by reference to the accompanying drawings in which—

Figure 3:
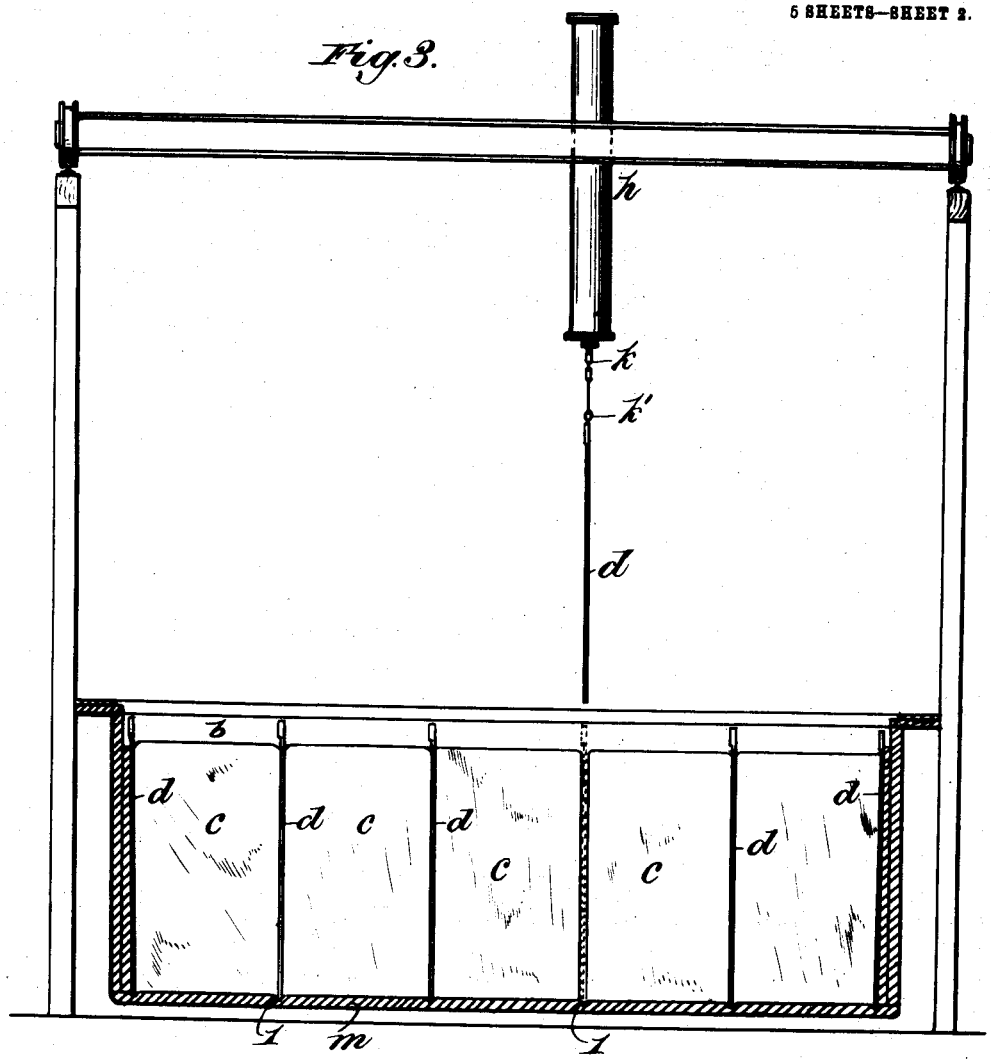
Figure 4:
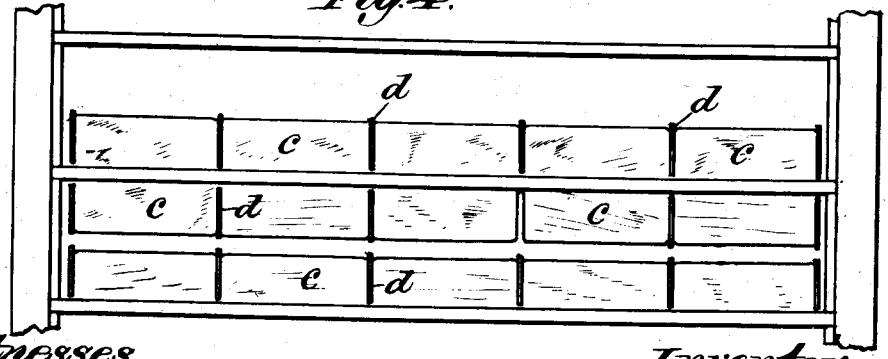

Figure 1 is a vertical section of a portion of a freezing tank, crosswise of the freezing plates and coils—showing two coils in cross section. Fig. 2 is a side elevation of a portion of one of the coils, showing also two of the dividing plates. Fig. 3 is a vertical sectional elevation of the tank the line of section being lengthwise of the plates. Fig. 4 is a plan of the same—representing however only a portion of the tank. Figs. 5, 8, 9 are diagrammatic views of modified arrangements of dividing plates and electrical connections therefor. Figs. 6, 7 are sectional views of a portion of the tank system in Fig. 5 showing more in detail the electrical circuit connections for the dividing plates in that figure. Figs. 10 and 11 are illustrations of details in the system shown in Fig. 9.

Confining attention for the present to Figs. 1-4, in the sectional view, Fig. 1, two sets of coils with their plates in a freezing tank, are shown—*a* being the pipes of which the coils are made up and through which the refrigerant passes; *b* being the iron plates on each side of said coils; and *c* being the ice frozen to said plates.

The dividing plates hereinbefore referred to are shown at *d*. They are thin, flat metal plates of comparatively low conductivity—say for example, galvanized sheet iron plates—which are set up in the tank on each side of the freezing plates *b*, at right angles or edgewise thereto and at suitable intervals apart. They rest upon the bottom of the tank, in guide grooves 1, in which their lower ends are received as indicated, in Fig. 2. They are set up vertically in the tank with an interval of say half an inch more or less separating them from the plates *b* which they adjoin so that there may be no electrical contact between them and the plates. At their upper ends the dividing plates are supported and steadied by clips 2 between the jaws of which they are held. These clips are secured to the freezing plates *b*, and suitable insulation must therefore be provided at these points also, to prevent electrical connection between the dividing plates *d*, and the freezing plates *b*. The dividing plates *d* in this instance are each slotted vertically as indicated at *e*, Fig. 1, the slot extending from the top partway the length of the plate, dividing it into two limbs united at or near the bottom. Each limb is provided with means for connecting it up in circuit, typified in this instance by plugs *f* and *g*, which are adapted to be connected to the opposite branches F G of an electrical circuit in the usual way.

The dividing plates *d*, insulated from electrical contact with the other parts of the tank as above explained, are set up in the tank before the ice begins to freeze. When the ice has formed and is ready to be harvested, the refrigerant in coil *a* is heated up, as customary, so as to thaw the ice from the freezing plates *b* on each side of the coil. The first dividing plate *d*, is then connected up in circuit F G by the plugs and wiring *f*, *g*, connected to the limbs of the dividing plate, as illustrated in Fig. 1 where one of the plates is shown thus connected up. The current passes down one limb of the plate and up the other (as indicated by the arrow in Fig. 1) and the plate is thereby heated up sufficiently to speedily free it from ice. The cutter is then hoisted out from the ice by crane *h* (Fig. 3), the hoist of which is attached by hook and chain *k*, to an eye *k'* on t! plate *d* (Fig. 1) the frame *k²* which holds the eye and which is attached to the plate *d* being of course suitably insulated from the latter. One of the plates *d* is shown pulled up out of the ice and suspended from the crane in Fig. 3.
The pulling out of the dividing plate from the ice, leaves a slot in the latter as indicated by dotted lines in Fig. 3. The dividing plates are successively detached from the ice and removed in this way. As soon as they are removed, the ice can be pried or "barred" loose from the bottom planks m of the tank, and can then be removed from the tank by the crane, or by any other means desired.

The electrical current used for the purpose is a low tension current of high amperage; and the plates d should be of sufficiently high specific resistance to produce the desired degree of heat when the current is passed through them. Without wishing at all to limit myself to any specific figures, I may say that I have obtained excellent results with a slotted plate of No. 14 galvanized sheet iron, about 40 inches long and with limbs 4 inches wide on each side of the slot e—the latter being ⅛ inch wide. The current used was about a 4 volt, 2200 ampere current. With this current a plate of the dimensions and quality above stated freed itself in less than 30 seconds from the ice in which it was embedded and frozen.

In this system it will be noted that the dividing plate has a two fold function in that it serves not only in effect as a cutter by which the cake of formed ice is divided up, in situ, into blocks of any size desired, but also as an electrical conductor, in which capacity it forms part of the circuit through which the electrical current is passed in order to produce the requisite heating effect. This I believe to be new with me, beyond its particular embodiment hereinbefore described.

In the remaining figures of the drawings I have illustrated some of the various ways in which my invention may be applied.

In all of the illustrations it will be understood, once for all, that the dividing plates are suitably insulated from the freezing plates or walls upon which the ice forms, as well as from such other parts of the apparatus as may be needed to prevent short circuiting.

In the scheme illustrated in Figs. 5, 6, 7, the dividing plates d are unslotted; and the two corresponding dividing plates d on opposite sides of the coil, are electrically connected, this connection passing beneath the coil, as indicated at n in Figs. 5 and 6. Such a connection can readily be made without interfering with the removability of the plates, their lower ends (see Fig. 7) fitting in grooves provided with spring yielding members n' of conducting material formed somewhat as the forks of a knife plate switch, corresponding members n' on opposite sides of the coil being electrically connected by connections n passing beneath the coil. The temporary circuit connections are made by applying the plugs and wiring f, g, one to each plate, as indicated in Fig. 6. The circuit then will be from one leg F of the circuit, through connection f down through one plate d, thence by connections n to plate d on the opposite side of the coil, up through that plate, and thence back to the other leg G of the circuit, through connection g. In this arrangement the two corresponding dividing plates on opposite sides of the coil will be heated simultaneously.

In the modification illustrated diagrammatically in Fig. 8, is shown a system of dividing plates arranged to free the ice cake on the bottom as well as to cut it into blocks. In this arrangement the end dividing plates d are set on a slant so as to make the cake of ice which forms on the freezing plate smaller, or of less length, at the bottom than at the top; the intermediate dividing plates d are vertical and each of them is connected, both mechanically and electrically, to a horizontal dividing plate d' of similar material; the mechanical connection between each vertical plate d and its bottom plate d' may be detachable, so as to permit each vertical plate to be hoisted out of the ice, as in the system hereinbefore described. One leg F of the circuit is connected permanently to the two end plates d, and to each one of the intermediate bottom plates d', by branch connections $f'$—$f^4$ inclusive; and each of the vertical dividing plates d at its top, may be connected at will to the other leg G of the circuit by plugs and wiring designated $g'$—$g^4$ inclusive. When any one of the intermediate plates d is plugged up into circuit— e. g. the plate carrying plug $g^2$—the circuit will be from F, through branch $f^2$, through bottom plate d' connected therewith thence up through plate d and out therefrom through plug $g^2$ to G. In this way both the bottom and the side plate of each pair will be heated at one operation. Connections from F, corresponding to $f'$—$f^4$ inclusive, can readily be made to the bottom plates d' pertaining to the next adjoining coil, as indicated for one pair d d' of such plates at the right hand end of the diagram.

In Figs. 9, 10, 11, I have represented a system of dividing plates which cut the ice on all three sides, and each set consisting of three electrically connected plates, each set being electrically connected to the other and the arrangement being such that the current can be passed through them either two or more in series, or each of them individually and successively. The three dividing plates of each set comprise two upright plates d and an intermediate bottom plate d' electrically and mechanically connected together. The two upright plates converge slightly towards their lower ends so that the block of ice included between them will be smaller at the bottom than at the top—this being to facilitate its removal from between the plates. These plates are fitted into the tank, and are designed to remain there permanently. The sets are placed in a row on each side of the freezing plates as shown in Fig. 9, and plate d of each set, is connected electrically and mechanically to the next adjoining plate d of the next set. Under this arrangement there will be between the interior opposite faces of the two plates d of adjoining sets a wedge shaped opening, which can be filled by a wedge shaped piece of wood o or other suitable filling material (Fig. 10) to stiffen the plates and to fill up a space which would otherwise be filled by ice.

The dividing plates can be suitably secured at the top to the frame of the freezing coil by brackets p, as illustrated in Fig. 11—such brackets being of course suitably insulated. The dividing plates are of course separated by an intervening space from the freezing coil or plate, as in the other arrangements hereinbefore described.

In this system of connected plates I can pass the electric current through the whole row of plates in series between the points F' and G' Fig. 9; or by suitable plugs and wiring (indicated by dotted lines in the same figure) each set of plates may be separately connected up, or two or more sets may be connected up in series as desired.

The plan last above described in connection with Figs. 9–11, is one which in practice has given excellent results, and is the one which I on the whole prefer; although I do not wish to be understood as limiting myself thereto. Other plans might also be set forth, but those hereinbefore described will suffice to illustrate the nature and scope of my invention.

In all of the plans heretofore in use, so far as I am aware, for detaching the ice cake, and dividing it up into smaller blocks by the application of heated appliances, not only has the operation been tediously slow and difficult but there has been great resultant waste and loss of ice due to excessive thawing.

All of these disadvantages are obviated by my invention, under which the ice can be harvested in a fraction of the time needed to do it in any other way, and the loss of ice in the harvesting operation is reduced to practically nothing.

Having described my invention and the best way now known to me of carrying the same into practical effect I state in conclusion that I do not limit myself strictly to the structural details hereinbefore set forth in illustration of my invention, since manifestly the same can be varied considerably without departure from the spirit of the invention; but

What I claim herein as new and desire to secure by Letters Patent is:

1. In ice machinery the combination with the tank and the freezing plate on which the ice is formed, of an upright dividing plate of relatively low electrical conductivity, set edgewise in proximity to, but insulated from, said freezing plate, and adapted to be embedded and frozen into the cake of ice as it forms, and electrical connections whereby said dividing plate may be connected up in circuit at will with a source of electrical supply, substantially as and for the purpose hereinbefore set forth.

2. In ice machinery the combination with the tank and the freezing plate on which the ice is formed, of an upright dividing plate and a horizontal bottom dividing plate of relatively low conductivity electrically connected together, set edgewise and in proximity to, but electrically insulated from, the freezing plate, and electrical connections whereby said dividing plates may be connected up in circuit at will with a source of electrical supply, substantially as and for the purposes hereinbefore set forth.

3. In ice machinery the combination with the tank and the freezing plate on which the ice is formed, of two substantially upright dividing plates and an intermediate bottom dividing plate electrically connected together and of relatively low conductivity, set edgewise and in proximity to, but electrically insulated from, the freezing plate, and electrical connections whereby said dividing plates may be connected up in circuit with a source of electrical supply substantially as and for the purposes hereinbefore set forth.

4. In ice machinery, the combination with the tank and the freezing plate on which the ice is formed, of a plurality of sets of dividing plates of low electrical conductivity placed tandem alongside of, but out of electrical contact with, said freezing plate, each set consisting of two upwardly diverging, upright plates and a bottom plate extending between and mechanically and electrically connecting their lower ends, electric connections between contiguous plates of adjoining sets, and electrical connections whereby the several sets may at will be connected up in circuit with a source of electrical supply, substantially as and for the purposes set forth.

In testimony whereof I affix my signature in presence of two witnesses.

THOMAS SHIPLEY.

Witnesses:
A. B. STRICKLER,
T. A. STEBBINS.